(12) United States Patent
AuYeung et al.

(10) Patent No.: US 6,169,623 B1
(45) Date of Patent: Jan. 2, 2001

(54) RASTER OUTPUT SCANNER WITH A FIELD REPLACEABLE COLLIMATOR ASSEMBLY

(75) Inventors: Vincent W. AuYeung, Temple City; Khuay Cam, Stanton; Nancy L. Brunsdon-Veloz, El Segundo, all of CA (US)

(73) Assignee: Xerox Corporation, Stamford, CT (US)

(*) Notice: Under 35 U.S.C. 154(b), the term of this patent shall be extended for 0 days.

(21) Appl. No.: 08/977,300

(22) Filed: Nov. 25, 1997

(51) Int. Cl.[7] .................................................. G02B 26/08
(52) U.S. Cl. ......................... 359/212; 359/216; 359/217; 359/641; 359/829
(58) Field of Search ...................... 359/196–226, 359/641, 811, 813, 819, 822, 823, 829

(56) References Cited

U.S. PATENT DOCUMENTS

| | | | |
|---|---|---|---|
| 5,255,115 | 10/1993 | Kikuchi | 359/209 |
| 5,381,438 | * 1/1995 | Guo et al. | 372/107 |
| 5,400,133 | * 3/1995 | Hinton et al. | 356/138 |
| 5,684,524 | 11/1997 | Hokamura | 347/134 |
| 5,701,191 | * 12/1997 | Iwasaki | 359/205 |
| 5,969,843 | * 10/1999 | Naiki et al. | 359/196 |

FOREIGN PATENT DOCUMENTS

| | | |
|---|---|---|
| 0 608 901 A2 | 8/1994 | (EP) . |
| 04285976 | 10/1992 | (JP) . |
| 04328515 | 11/1992 | (JP) . |
| 07261115 | 10/1995 | (JP) . |

* cited by examiner

*Primary Examiner*—James Phan
(74) *Attorney, Agent, or Firm*—William Propp

(57) ABSTRACT

A raster output scanner is disclosed which utilizes a collimator assembly which can be replaced at the field. The collimator assembly is mounted on a raster output housing. Both the raster output housing and the collimator assembly have securing means to secure the collimator assembly to the raster output scanner housing. The raster output scanner housing and the collimator assembly are designed to provide automatic adjustment for the light beam exiting from the collimator assembly with the optical path within the ROS housing once the collimator assembly is secured to the raster output scanner housing.

10 Claims, 6 Drawing Sheets

RASTER OUTPUT SCANNER WITH A FIELD REPLACEABLE COLLIMATOR ASSEMBLY

This application relates to U.S. patent application Ser. No. 08/976,818 U.S. Pat. No. 6,043,835, "A Raster Output Scanner With Field Replaceable Laser Diode" (Common Assignee) filed concurrently herewith.

BACKGROUND OF THE INVENTION

This invention relates generally to raster scanning systems and more particularly, to a raster output scanner which utilizes a collimator assembly which can be replaced in the field at a customer location without disassembling the raster output scanner and sending it back to the manufacturer for replacement.

Typically, a laser printer utilizes a raster output scanner. Referring to FIG. 1, there is shown a tangential (fast-scan) view of the raster output scanner 10 of a printing system. The raster output 10 utilizes a laser light source 12, a collimator 14, mirrors 16 and 18, pre-polygon optics 20 and 22, mirror 24 a multi-faceted rotating polygon mirror 26 as the scanning element, post polygon optics 28, mirror 30 and a photosensitive medium (photoreceptor) 32.

The laser light source 12 sends a light beam 34 to the rotating polygon mirror 26 through the collimator 14 and the pre-polygon optics 20 and 22. Mirrors 16, 18 and 24 fold and redirect the light beam 34 prior to the scanning polygon 26 and mirror 30 folds and redirects the light beam 34 after the scanning polygon 26. Mirror 30 is slanted to redirect the light beam 34 outside of the ROS housing onto the photoreceptor 22 to scan a line S.

The collimator 14 collimates the light beam 34 and the pre-polygon optics 20 focuses the light beam 34 in the sagittal or cross-scan plane onto the rotating polygon mirror 26. However, since this system is an overfilled system, the light beam stays collimated in the tangential plane while striking the polygon mirror 26. The facets 36 of the rotating polygon mirror 26 reflect the light beam 34 and also cause the reflected light beam 34 to revolve about an axis near the reflection point of the facet 36. The reflected light beam 34 is utilized through the post polygon optics 28 to scan the photoreceptor 32.

Typically, all the above optical elements except the laser light source 12 and the collimator 14 are placed in a Raster Output Scanner (ROS) housing 38. The laser light source 12 and the collimator 14 are placed in a collimator assembly 40 which is mounted onto the ROS housing 38.

Referring to FIG. 2, there is shown an isometric view of the collimator assembly 40 and a portion of the ROS housing 38 of FIG. 1. Referring to Both FIGS. 1 and 2, ROS housings 38 is usually made of plastic or metal and has an opening 42 for receiving a light beam from the laser light source 12. The collimator assembly 40 holds the laser diode 12 and the collimator 14. The base 46 of the collimator assembly 40 is mounted on wall 44 of the housing 38 in such a manner that the axis 48 of the collimator assembly coincides with optical path 35. The optical path 35 is the optical axis of the optical elements within the ROS housing 38. The laser diode 12 emits a light beam 34 and collimator 14 collimates and sends the light beam 34 into the ROS housing 38 through the opening 42. Within the ROS housing 38, the light beam 34 travels along the optical path 35.

During manufacturing, after the collimator assembly 40 is mounted on the ROS housing 38, the position of the light beam 34 from the laser diode has to be adjusted to overlap the optical path 35 and the intensity of the light beam 34 has to be adjusted to match a required discharge level of the photoreceptor used in that specific printer. Adjusting the position and the intensity of the light beam 34 are very critical in the print quality. For example, if the light beam 34 does not travel on the optical path 35, the light beam striking the photoreceptor might be out of focus which causes the print to be blurred. In addition, if the intensity level of the light beam happens to be over or under the required level, the print will be darker or blank respectively.

The above adjustments are done based on the location and the characteristics of the laser diode. The pointing of a laser diode with respect to the optical path 35 depends on the mounting of the collimator assembly to the ROS housing. Furthermore, characteristics of each individual laser diode is different from characteristics of other laser diodes. Therefore, in order to adjust the intensity of a laser diode, the laser driving current has to be adjusted. As a result, if a laser diode of a printer needs to be replaced, the whole ROS housing is used to readjust a new replacement collimator assembly.

Therefore, in order to replace a laser diode, the ROS housing, including the collimator assembly, has to be dismounted from the printer and sent back to the manufacturing. Since the ROS housing holds expensive optical elements, it is desirable not to transfer it back to manufacturing to prevent any damage to the optical elements. Furthermore, transferring the ROS housing to the manufacturing for repair or replacement can be very costly to the user in terms of loss of productivity. Therefore, it is advantageous to replace the collimator assembly in the field instead of sending the ROS housing back to the manufacturer.

It is an object of this invention to design a collimator assembly which can be replaced, aligned and adjusted in the field.

SUMMARY OF THE INVENTION

The present invention is directed to a design implementation of raster output scanner with a field replaceable collimator assembly containing a laser diode. The collimator assembly of this invention, which acts as a pointing device, is removeably mounted on a raster output housing. The design of the collimator assembly and the raster output housing both have aligning means and securing means designed in such a manner that once the aligning means are engaged, the collimator assembly can be slightly moved in the tangential plane to align the securing means. Once the securing means are engaged, the light beam from the collimator is in alignment with an optical path within the raster output housing.

DESCRIPTION OF THE PREFERRED EMBODIMENT

This invention provides a collimator assembly, which can be replaced and adjusted automatically in the field without the need to transfer the expensive parts back to the manufacturer for replacement. The collimator assembly of this invention is designed in such a manner that once the base is mounted on the ROS housing, the light beam from the laser diode in the collimator assembly will be precisely aligned to the optical path of the ROS housing.

It should be noted that in this specification, "collimator assembly" shall mean "a collimator assembly which contains a laser diode".

Figure 3:
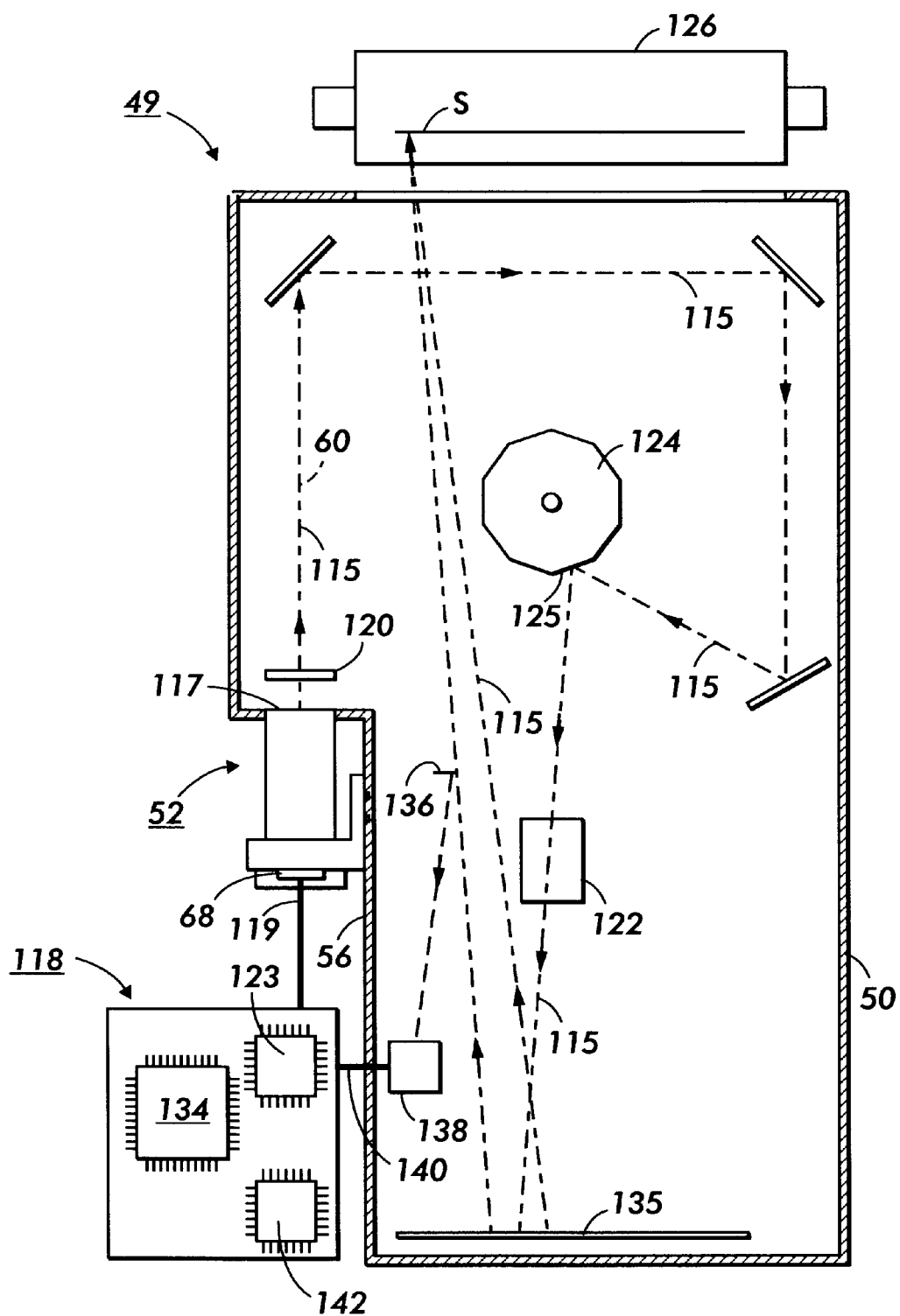
FIG. 3 shows a tangential view of the ROS system of this invention which includes a ROS housing, a collimator assembly, an electronic circuit board connected to a laser diode of the collimator assembly.
Figure 4:
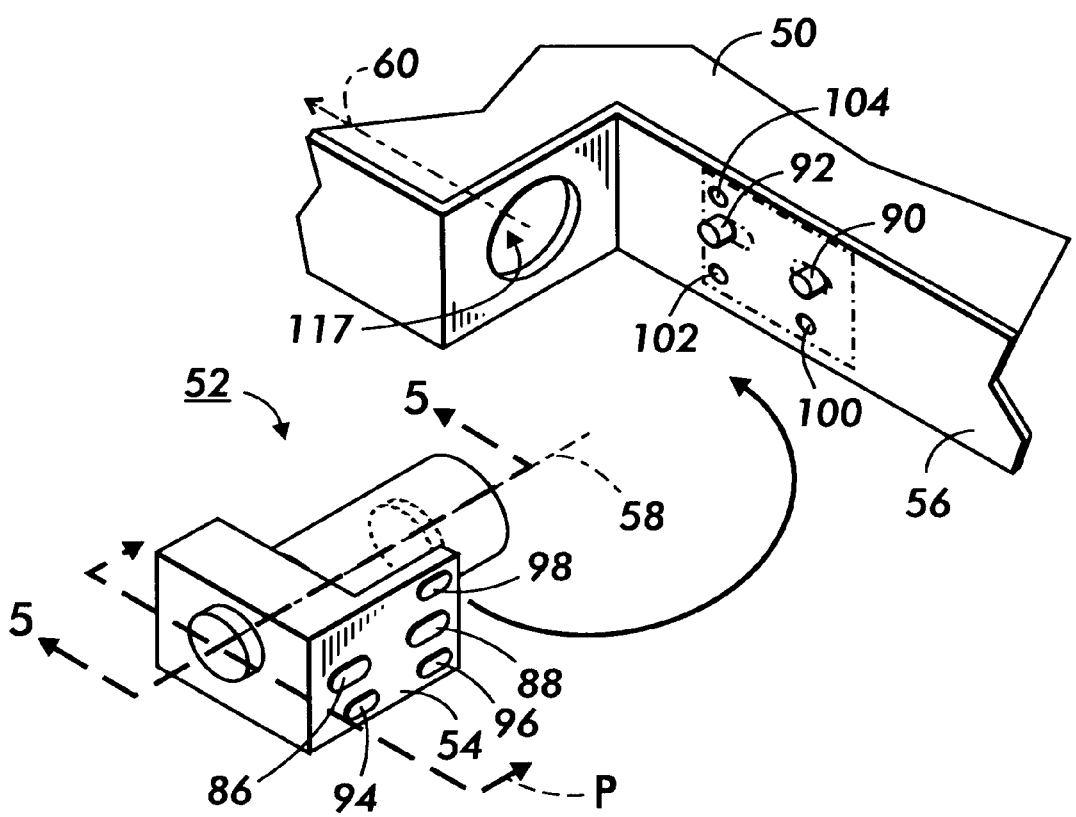
FIG. 4 shows an isometric view of the collimator assembly and a portion of the ROS housing of FIG. 3.

Furthermore, this invention provides a microchip for each collimator assembly. Each microchip contains the information about the characteristics of the laser diode used in its respective collimator assembly. Once a collimator assembly is replaced, its respective microchip on the laser controlling electronics has to be replaced to create a new set of currents that match the characteristics of the new laser diode. The new set of currents once applied to the new laser diode will cause the laser diode to produce the original ROS exposure levels. In this invention, the design of the ROS housing and the laser driving electronics are modified to accept the newly designed collimator assembly of this invention and its microchip. Referring to FIG. 3, there is shown a tangential view of a raster output scanner 49 of this invention and referring to FIG. 4, there is shown a collimator assembly 52 and a portion of the ROS housing 50 of FIG. 3. In FIG. 4, the collimator assembly 52 is rotated away from the ROS housing 50 to show the base 54 of the laser assembly, which has to be mounted on the wall 56 of the ROS housing 50. The collimator assembly 52 of this invention is designed to have a highly precise relationship between its optical axis 58 and its base 54. Furthermore, the base 54 of the collimator assembly 52 and the ROS housing 50 have a design in such a manner that once the collimator assembly 52 is mounted on the ROS housing 50, the optical axis 58 will be aligned with the optical path 60 (optical axis of the optical elements within the ROS housing 50).

Figure 5:
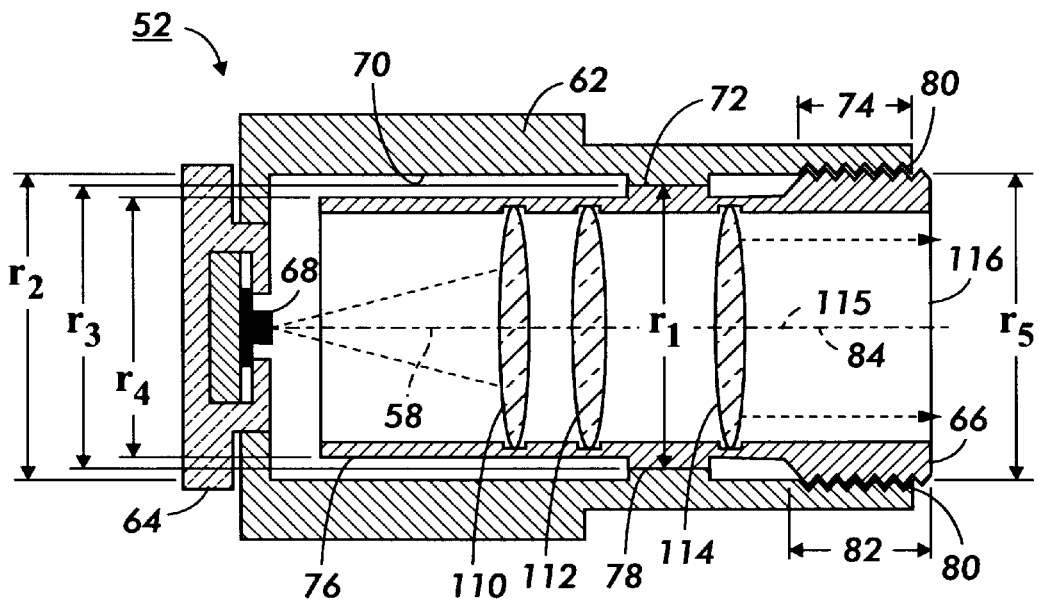
FIG. 5 shows a cross sectional view of the collimator assembly of this invention along plane 5—5 of FIG. 3.

Referring to FIG. 5, there is shown a cross sectional view of the collimator assembly 52 of this invention along plane 5—5 of FIG. 4. The collimator assembly 52 has a cylindrical housing 62, which receives a laser diode fixture 64 and a lens barrel 66. The laser diode fixture 64, which holds a laser diode 68, is aligned with respect to the optical axis 58 of the cylindrical housing 62 in such a manner that the center ray of the light beam 155 of the laser diode 68 coincides with the optical axis 58. Once, the laser fixture 64 is aligned with respect to the optical axis 58, the laser fixture 64 will be secured to the cylindrical housing 62 by any well-known means such as screw or adhesive. The inner surface 70 of the cylindrical housing 62 has a cylindrical surface 72 which has a radius $r_1$ which is smaller than the radius $r_2$ of the inner surface 70 of the cylindrical housing 62.

In addition, the inner surface 70 of the cylindrical housing 62 also has a threaded portion 74. The outer surface 76 of the lens barrel 66 has a surface 78 which has a radius $r_3$ which is larger than the radius $r_4$ of the outer surface 76, smaller than the radius $r_5$ of the peaks 80 of the threaded portion 74 and slightly smaller than the radios $r_1$ of the surface 72. The radius $r_3$ of the surface 78 is designed in such a manner to contact surface 72. Furthermore, the outer surface 76 of the lens barrel 66 has a threaded portion 82 to engage the threads of the thread portion 74 of the cylindrical housing 62.

Surfaces 72 and 78 are designed in such a manner that once they are in contact with each other, the axis 84 of the lens barrel 66 coincides with the axis 58 of the cylindrical housing 62. Threads of the threaded portions 74 and 82 are designed to keep the surfaces 72 and 78 in a fixed position.

Figure 6:
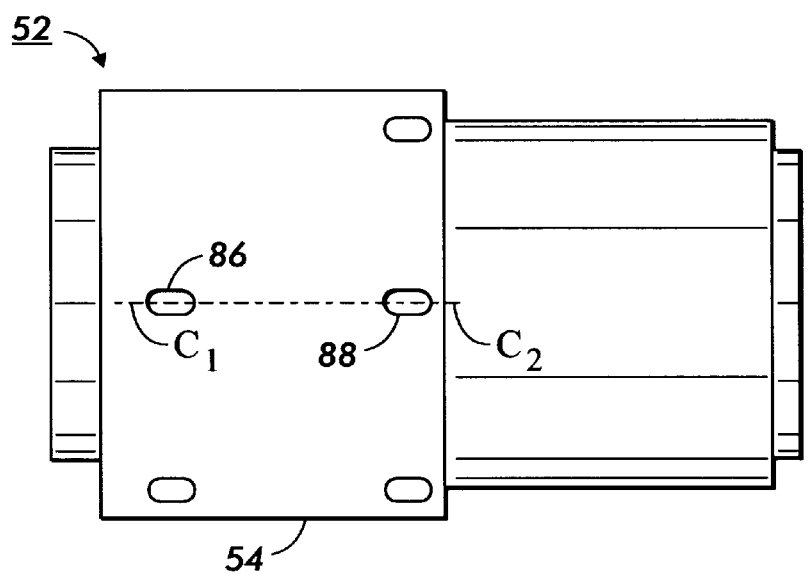
FIG. 6 shows a base view of the collimator assembly of this invention.

Referring to FIG. 6, there is shown a base view of the collimator assembly 52. The base 54 of the collimator assembly 52 will be mounted on the wall 56 of the ROS housing 50 of FIGS. 3 and 4. Referring to both FIGS. 4 and 6, the base 54 has two slots 86 and 88. The center lines $C_1$ and $C_2$ of the slots 86 and 88 respectively are located on a tangential plane P of FIG. 4 which holds the two optical axis 58 and 84. Each one of the slots 86 and 88 receives one of the pins 90 and 92 of the ROS housing 50. The two slots 86 and 88 are built with a high precision to receive the pins 90 and 92. The design of the slots 86 and 88 provide a high precision in the sagittal plane to prevent any movement of the pins 90 and 92 in the sagittal plane in order to align the optical axis 58 of the collimator assembly 52 with the optical path 60 of the ROS housing 50. However, the slots 86 and 88 accommodate enough space for a slight movement of the pins 90 and 92 in the tangential plane along the optical axis 58.

The purpose of having enough space for the movement of the pins 90 and 92 within slots 86 and 88 respectively is to provide flexibility for the alignment of holes 94, 96 and 98 of the base 54 to the holes 100, 102 and 104 of the ROS housing 50 respectively. Since the collimator assembly sends out a collimated light beam, the movement of the collimator assembly in the tangential plane has minimal effect on the characteristics of the light beam exiting the collimator assembly. However, if the collimator assembly moves in the sagittal direction the alignment of the optical axis 58 of the collimator assembly 52 and the optical path 60 of the ROS housing 50 will be disturbed. Therefore, the slots 86 and 88 are designed to fix the position of the collimator assembly 52 in the sagittal plan once they receive the two pins 90 and 92.

The alignment of holes 94, 96 and 98 to the holes 100, 102, 104 require a slight movement of the collimator assembly along the optical path 60 of the ROS housing while the pins 90 and 92 are within the slots 86 and 86. After the collimator assembly 52 is adjusted in the tangential plane to align the holes 94, 96 and 98 to the holes 100, 102 and 104, the collimator assembly 52 will be fixed to the ROS housing by using a first screw through the holes 94 and 100, a second screw through the holes 96 and 102 and a third screw through the holes 98 and 104. The holes 100, 102 and 104 have threads to receive the threads of their respective screws.

It should be noted that in this invention, the screws used to mount the collimator assembly 52 to the ROS housing 50 can be replaced by any replaceable means, which can mount the collimator assembly 52 to the ROS housing 50.

Figure 1:
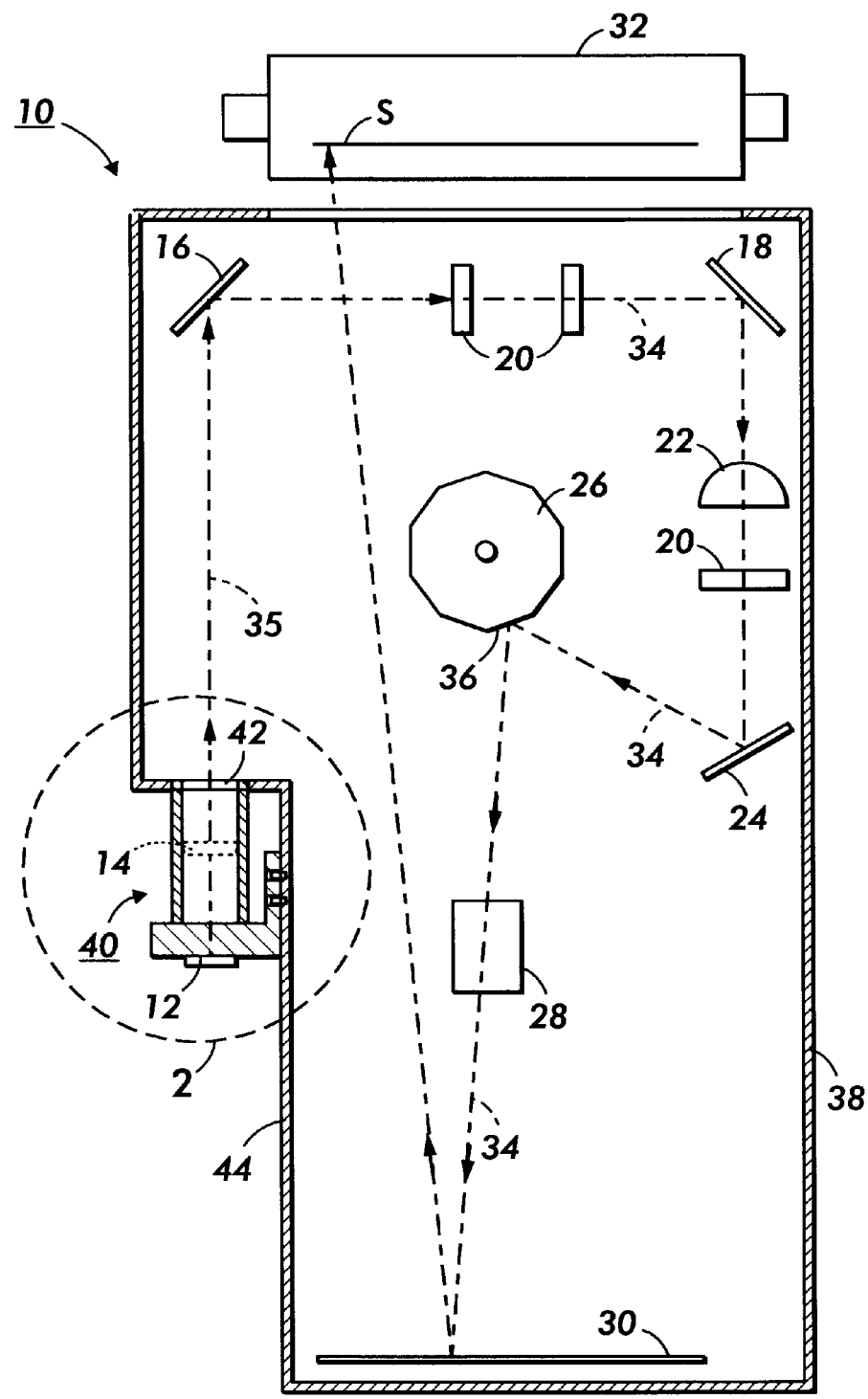
FIG. 1 shows a tangential (fast-scan) view of the raster output scanner of a prior art printing system.
Figure 2:
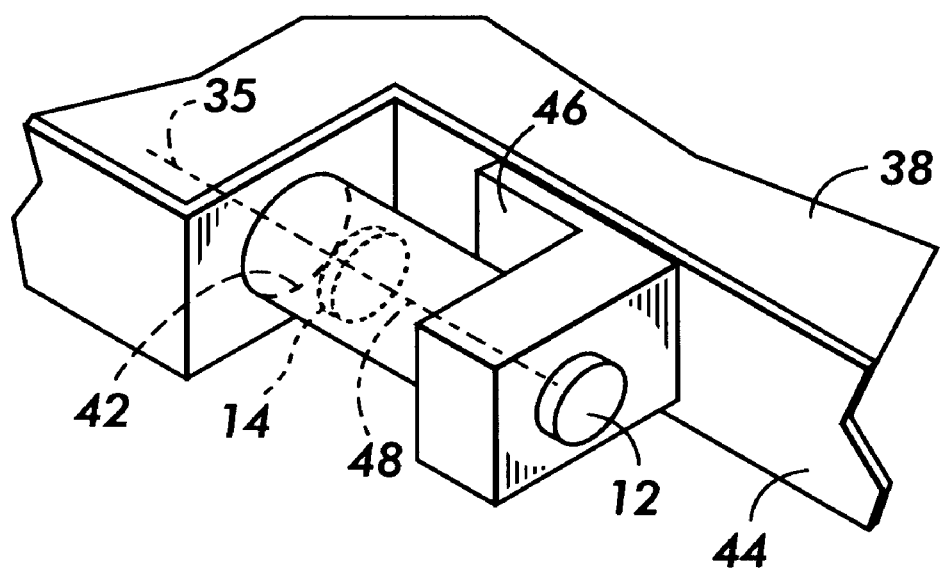
FIG. 2 shows an isometric view of the collimator assembly and a portion of the ROS housing of FIG. 1.

During the initial design stages of this invention, once the collimator assembly 52 was precisely mounted onto the ROS housing 50, the center ray of the laser light beam still did not precisely align with the optical path 60 of the ROS housing 50. The problem was caused by the optical elements of a conventional ROS system. Referring back to FIG. 1, in a conventional ROS housing such as housing 38, the light beam 34 from the collimator assembly 40 has to travel through several magnifying optical elements such as elements 20. The magnifying optical elements 20 are required to produce a wide beam in order to cover at least one facet 36 of a polygon 26.

It should be noted that the preferred embodiment of this invention is designed for an overfilled ROS system. However, the disclosed embodiment of this invention can also be used for an undefiled ROS system. Since the preferred embodiment of this invention is designed for an overfilled, in this specification, "ROS system" shall mean, "overfilled ROS system".

In a conventional ROS system such as ROS system 10, any slight error in the position of light beam from the collimator assembly will be magnified by several magnifying optics, which may cause pointing error that results in laser exposure degradation. Due to the tolerance range of the adjustment of the light beam to the optical axis of the collimator assembly, slight errors in the position of the light beam are inevitable. Even a slight disposition within the tolerance range, once magnified, can cause a major error. Therefore, even if a collimator assembly is precisely mounted on a ROS housing, a disposition within the tolerance range may cause a major error.

In order to resolve this issue, the magnifying optical elements 20 of the conventional ROS housing 38 are moved into the collimator assembly 52 of this invention. Referring to FIG. 5, three lenses 110, 112 and 114 are used in combination to collimate and magnify the light beam 115 of the laser diode 68.

Since, the lenses 110, 112 and 114 are placed in the collimator assembly 52, the light beam 115 from the laser diode 68 will be collimated with the correct pointing and magnified before exiting the collimator assembly 52 from the exit window 116. As a result, all the elements in the collimator assembly maintain a fixed position with respect to one another. This will keep the exiting light beam at a substantially correct position which reduces the disposition error associated with changing collimator assemblies.

Placing lenses 110, 112 and 114 inside the collimator assembly 52 requires an aperture to be placed inside the ROS housing 50 upstream from the opening 117 of FIG. 3. Referring to FIG. 3, the ROS system 49 comprises the ROS housing 50 with the collimator assembly 52 mounted thereto along with an electronic circuit board 118 which is connected to the laser diode 68 of the collimator assembly 52 through cable 119. In the ROS housing 50, aperture 120 limits the width of the light beam 115 exiting from the collimator assembly and entering the ROS housing 50.

Figure 7:
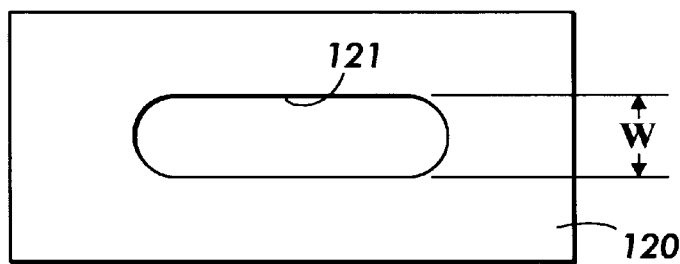
FIG. 7 shows an aperture which has an elliptical opening.

Referring to FIG. 7, there is shown a beam shaping aperture 120, which defines an elliptical opening 121. Beam shaping aperture 120 is needed to limit the width of the light beam to W in order to create a proper spot size on the photoreceptor. Referring to Both FIGS. 3 and 7, typically, the post polygon optics 122 focuses the reflected light beam 115 from the polygon 124 onto the photoreceptor 126. In FIG. 3, for the purpose of clarity, prior to mirror 135, the light beam 115 is shown by its center ray and after mirror 135, it is shown by its outer rays. If the width of the light beam 115 is too wide or too narrow, the spot size on the photoreceptor will be different than the required spot size.

Therefore, the width of the light beam at the polygon facet 125 has to be at a given width to produce a given spot size. Since the magnifying lenses are placed in the collimator assembly 52, if the collimator assembly is replaced, due to the tolerances of the lenses, the magnification factor might be slightly different on each collimator assembly. As a result, in order to create a given width light beam, the aperture 120 is placed inside the ROS housing 50 to clip the width of the light beam to the given width W.

Once a collimator assembly of a printing system is replaced, the driving current of the laser diode has to be modified in order to provide the required exposure levels at the photoreceptor. In this invention, each individual collimator assembly has a dedicated microchip. The characteristics of the laser diode of each collimator assembly are stored in the respective microchip.

In the field, once a collimator assembly is replaced, the respective microchip also has to be replaced. A microprocessor inside the printer receives the new data about the laser diode of the newly installed collimator assembly. The new data is used to create a new set of data which will be stored in a lookup table and will be used to map the laser diode. Applying a certain current to the laser diode to create certain exposure level on the photoreceptor is called mapping.

Figure 8:
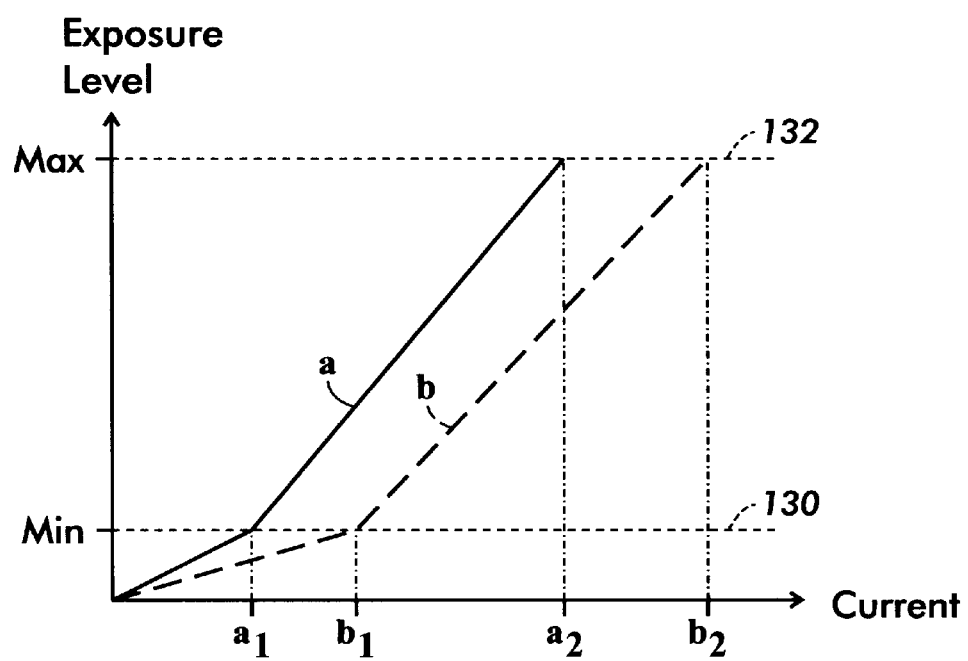
FIG. 8 shows a graph of the exposure levels required by a photoreceptor.

The reason the laser diode needs to be mapped depends on the exposure levels of the photoreceptor. Referring to FIG. 8, there is shown a graph of the exposure levels required by a photoreceptor. Level 130 represents the minimum level of exposure, which discharges the photoreceptor. Any exposure level below level 130 does not affect the charges on the photoreceptor. Level 132 represents the maximum exposure level. Any exposure level above level 132 over exposes the photoreceptor, which causes the pixel to become undesirably darker or lighter depending on the type of xerographic system. However, it may end up over driving the laser diode and gradually damaging the laser diode.

In FIG. 8, lines a and b show the characteristics (exposure lines) of two different laser diodes a and b respectively. As can be observed, the slope of the exposure line of each laser diode is different than the slope of the exposure line of other laser diode. Therefore, in order to achieve the same exposure levels required by the photoreceptor, each laser diode requires different currents. For example, diode a requires $a_1$ mA to create the minimum exposure level and diode b requires $b_1$ mA to create the minimum exposure level. In the same manner, diode a requires $a_2$ mA to create the maximum exposure level and diode b requires $b_2$ mA to create the maximum exposure level.

Typically, in order to create different exposure levels, the difference between the minimum exposure level and the maximum exposure level is divide by 255 to create 255 exposure levels. For each laser diode, each one of these exposure levels requires a different current. As a result, when a laser diode is replaced, different currents may have to be applied to the new laser diode to produce the original ROS exposure set up.

Referring back to FIG. 3, after the collimator assembly 52 is replaced, microchip 134, which is located on circuit board 118, has to be replaced. The replacement microchip 134 contains the information about the characteristics of the new laser diode. The program in the printer needs to use the characteristic information from the microchip to update laser diode current lookup tables. The data in the microchip provides information about the slope and the starting point of the slope of the exposure line of the laser diode.

Once, the microchip is replaced, the person who is replacing the collimator assembly and the microchip has to activate a diagnostic subroutine. The subroutine can be activated either by pushing certain buttons on the interface of the printer or the microprocessor can have a detection scheme to detect the microchip replacement and activate the subroutine automatically. The diagnostic subroutine is programmed in a microprocessor 123 which is connected to the electronic circuit board 118. Once activated, the diagnostics subroutine will access the newly placed microchip and retrieves the data. Then, the subroutine uses the data from the microchip to activate the laser diode. Subsequently, it measures the minimum and maximum exposure levels of the light beam from the laser diode at the photoreceptor.

Referring to FIG. 3, once a light beam exits the collimator assembly, it has to travel through several optical elements within the ROS housing before it reaches the photoreceptor. These optical elements affect the exposure level of the light beam passing through them. Therefore, if a laser diode emits a light beam which has the maximum required exposure level, once the light beam passes through the optical elements and reaches the photoreceptor, its exposure level is changed and it no longer meets the maximum required exposure level. In order to provide a proper exposure level at the photoreceptor, the minimum and maximum exposure levels of the light beam have to be measured within the ROS housing prior to the photoreceptor as opposed to the exit window of the collimator assembly.

In order to measure the exposure levels of the light beam at the photoreceptor, after the last optical element (post polygon optics 122) prior to the photoreceptor, a portion of the light beam 115 is being deflected by a mirror 136 onto a scan detector 138. Scan detector 138 is connected to the electronic circuit 118 through cable 140.

The role of subroutine is to receive the measured exposure level of the laser diode 68 at the photoreceptor 126 from the scan detector 138 and compare it to a required maximum exposure level. Then, the diagnostic subroutine has to adjust the current of the laser diode 68 to cause the maximum exposure level of the light beam 115 at the photoreceptor 126 to match the required maximum exposure level. Once the required maximum exposure level is established, the current will be measured and recorded. The subroutine has to perform the same function for the minimum current and record the current.

Subsequently, the subroutine divides the difference between the minimum and maximum current by 256 to determine the current levels, which can produce different shades of exposure. The 255 current levels as well as the minimum and maximum current levels will be stored in a lookup table such as a random access memory (RAM) 142 by over writing the current values, which were used for the previous laser diode.

The disclosed invention, provides a fast, efficient, and cost effective solution to repair large laser printers since it eliminates the down time during which the parts have to be transferred to the manufacturer, the need for transferring expensive parts from the field to the manufacturer and back or the need to carry expensive parts for every repair call.

It should be noted that the preferred embodiment of this invention has been designed for a field replaceable collimator assembly having an integrated laser diode. However, the concept of the replaceable microchip containing the characteristics of its respective laser diode can also be applied to a raster output scanner with a field replaceable laser diode.

It should further be noted that numerous changes in details of construction, the combination and arrangement of elements may be resorted to without departing from the true spirit and scope of the invention as hereinafter claimed.

What is claimed is:

1. A raster output scanner comprising:
a raster output scanner housing;
a replaceable collimator assembly having a laser diode for emitting a light beam;
said collimator assembly collimating and sending the light beam from said laser diode to said raster output scanner housing;
said raster output scanner housing having an opening to receive said light beam from said collimator assembly;
a first securing means being located on said raster output scanner housing;
a second securing means for engaging said first securing means to secure said collimator assembly to said raster output scanner housing;
said second securing means being located on said collimator assembly;
said raster output scanner housing having a first aligning means;
said collimator assembly having a second aligning means for engaging said first aligning means;
said first aligning means being so constructed and arranged to allow said second engaged aligning means to tangentially move to provide a fine alignment between said first and said second securing means; and
said collimator assembly and said raster output housing being so constructed and arranged that once secured to each other, the light beam from said collimator assembly travels on an optical path in said raster output scanner housing.

2. The raster output scanner recited in claim 1, wherein said collimator assembly magnifies the collimated light beam.

3. The raster output scanner recited in claim 1, wherein said collimator assembly further comprises a first, a second and a third optical lens for collimating and magnifying the light beam.

4. The raster output scanner recited in claim 1, wherein said raster output scanner housing further comprises a beam shaping aperture upstream from said opening of said raster output scanner housing.

5. The raster output scanner recited in claim 1, wherein said first aligning means is two pins and said second aligning means is two slots.

6. The raster output scanner recited in claim 1, wherein said first securing means is a threaded hole and said second securing means is a threaded hole and a screw.

7. A raster output scanner comprising:
a raster output scanner housing;
a collimator assembly having a laser diode for emitting a light beam;
said collimator assembly collimating and sending the light beam from said laser diode to said raster output scanner housing;
said raster output scanner housing having an opening to receive said light beam from said collimator assembly;
said raster output scanner housing having at least one pin;
said collimator assembly having at least one slot for receiving said at least one pin;
said at least one slot being so constructed and arranged to allow said collimator assembly to tangentially move to provide a fine alignment between said collimator assembly and said raster output scanner housing;
means for securing said collimator assembly to said raster output scanner housing for keeping said collimator assembly in alignment with said raster output scanner housing; and
said collimator assembly and said raster output housing being so constructed and arranged that once secured to each other, the light beam from said collimator assembly travels on an optical path in said raster output scanner housing.

8. The raster output scanner recited in claim 7, wherein said collimator assembly further comprises a first, a second and a third optical lens for collimating and magnifying the light beam.

9. The raster output scanner recited in claim 7, wherein said raster output scanner housing further comprises an aperture upstream from said opening of said raster output scanner housing.

10. A raster output scanner comprising:

a raster output scanner housing;

a collimator assembly having a laser diode for emitting a light beam;

said collimator assembly collimating and sending the light beam from said laser diode to said raster output scanner housing;

said raster output scanner housing having an opening to receive said light beam from said collimator assembly;

a first securing means being located on said raster output scanner housing;

a second securing means for engaging said first securing means to secure said collimator assembly to said raster output scanner housing;

said second securing means being located on said collimator assembly;

said raster output scanner housing having a first aligning means;

said collimator assembly having a second aligning means for engaging said first aligning means;

said first aligning means being so constructed and arranged to allow said second engaged aligning means to tangentially move to provide a fine alignment between said first and said second securing means;

said laser diode receiving a current for emitting the light beam;

an electronic circuit board for supplying said current to said laser diode and for applying a set of values to said current of said laser diode;

a replaceable microchip containing characteristics information of said respective laser diode;

said microchip being in electrical communication with said electronic circuit board;

said electronic circuit board being so constructed and arranged that once said microchip and said respective laser diode are replaced, said electronic circuit board in response to characteristic information contained in said microchip, applies a new set of values to said current of said laser diode; and said collimator assembly and said raster output housing being so constructed and arranged that once secured to each other, the light beam from said collimator assembly travels on an optical path in said raster output scanner housing.

* * * * *